J. W. LOESSIN.
TURN TABLE FOR AUTOMOBILES.
APPLICATION FILED JULY 13, 1918.
1,280,504.
Patented Oct. 1, 1918.
3 SHEETS—SHEET 1.
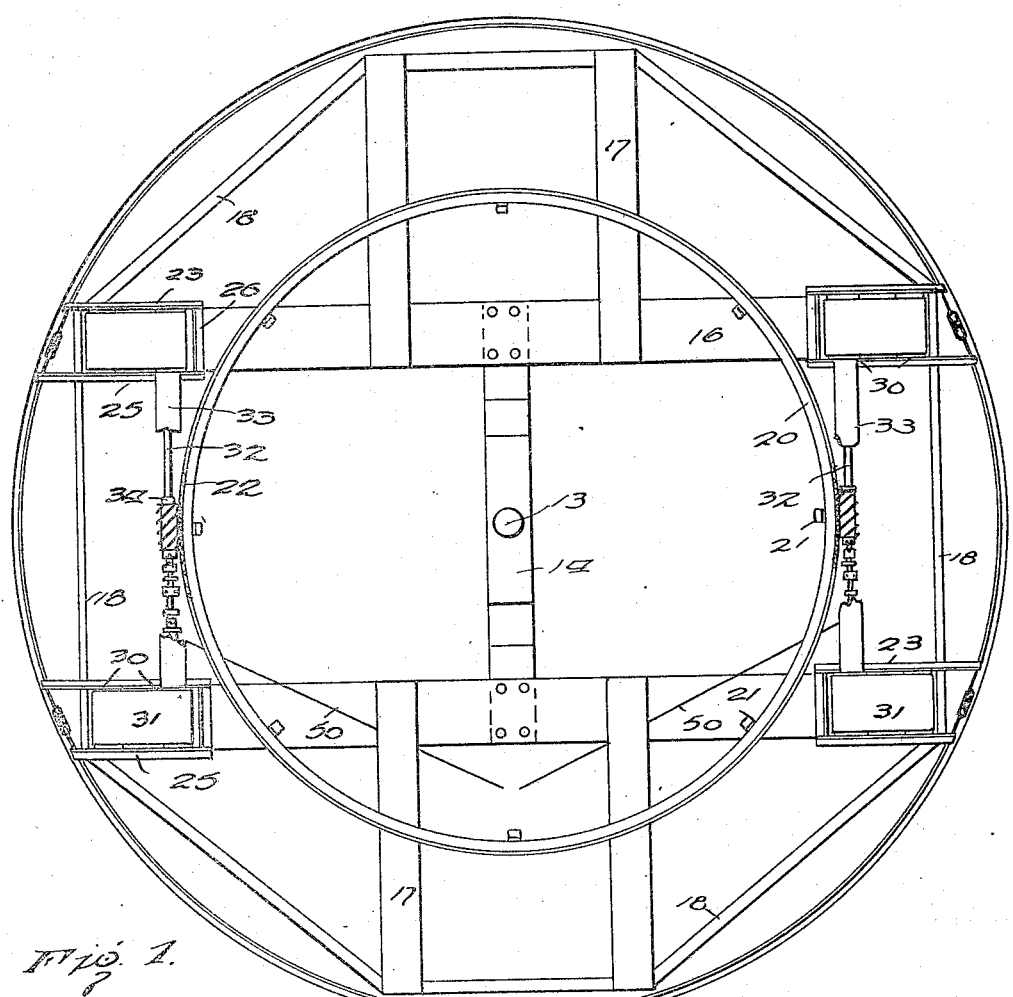
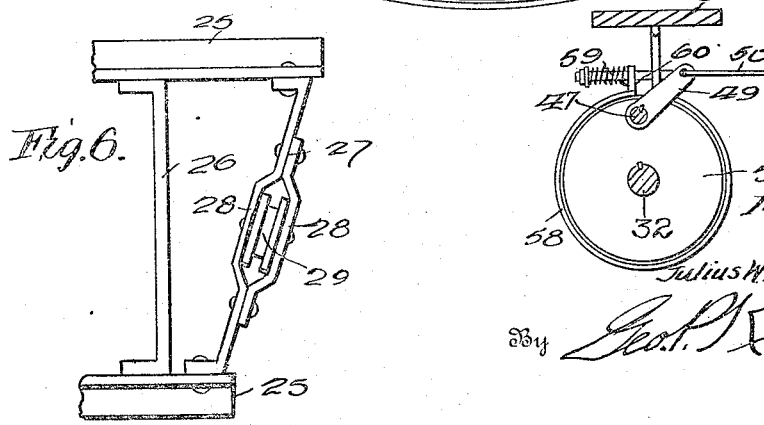

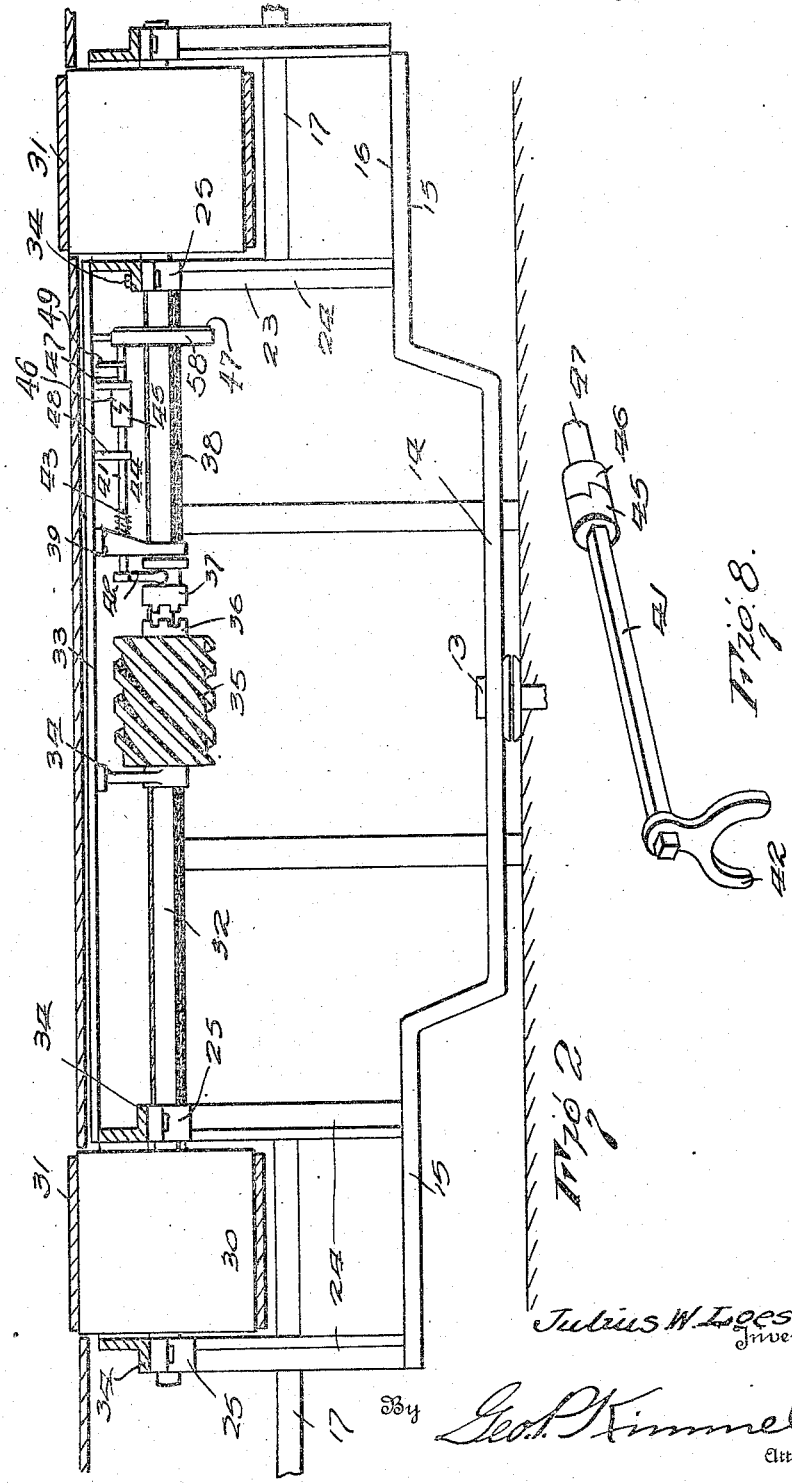

J. W. LOESSIN.
TURN TABLE FOR AUTOMOBILES.
APPLICATION FILED JULY 13, 1918.
1,280,504.
Patented Oct. 1, 1918.
3 SHEETS—SHEET 3.
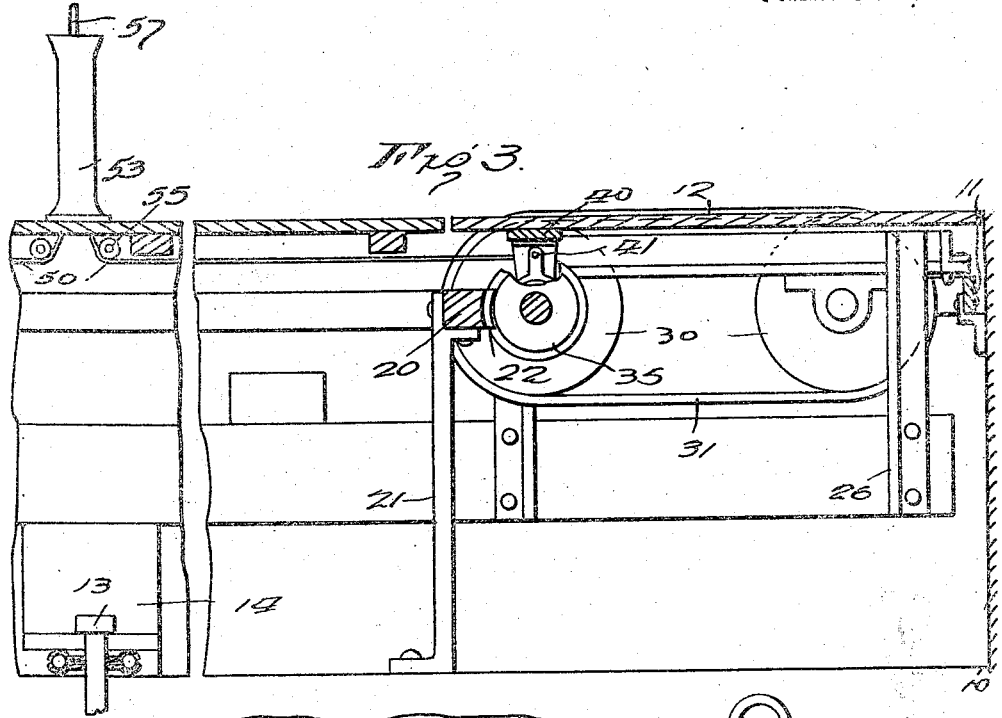
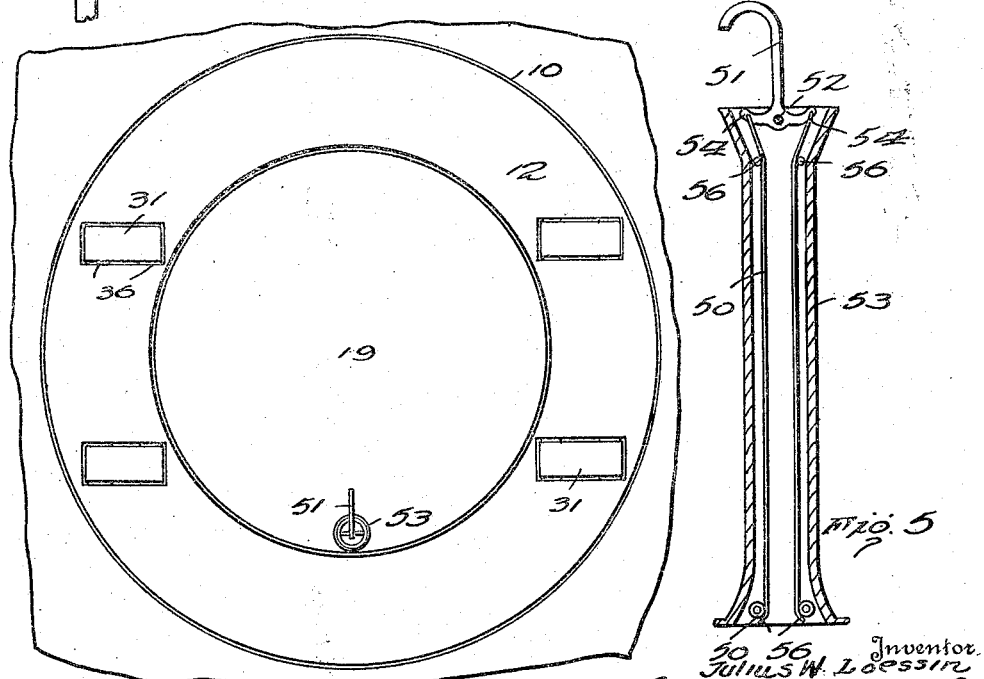
Inventor
Julius W. Loessin
By Geo. P. Kimmel
Attorney

UNITED STATES PATENT OFFICE.

JULIUS W. LOESSIN, OF LAGRANGE, TEXAS.

TURN-TABLE FOR AUTOMOBILES.

1,280,504.   Specification of Letters Patent.   Patented Oct. 1, 1918.

Application filed July 13, 1918. Serial No. 244,730.

*To all whom it may concern:*

Be it known that I, JULIUS W. LOESSIN, a citizen of the United States, residing at Lagrange, in the county of Fayette and State of Texas, have invented certain new and useful Improvements in Turn-Tables for Automobiles, of which the following is a specification.

This invention relates to improvements to turntables and more particularly to those adapted for use in garages or the like, and adapted to be operated from the drive wheels of an automobile, whether said automobile is provided with a rear drive or a front drive, thereby utilizing the power of the automobile to change the position of the automobile to permit it to be stored or to make its exit, or otherwise with facility.

It is, therefore, an important object of the invention to provide an improved construction for turntables including novel means for driving the same to cause it to turn within a depression or well, the device also being under control of the driver of the car, without the necessity of getting out of the car to operate the turntable, that is, to throw the drive mechanism into and out of operative position.

With the above and other objects in view, as will appear as the description proceeds, the invention comprises the various novel features of construction and arrangement of parts which will be more fully described herein and set forth with particularity in the claims appended hereto.

Reference is had to the accompanying drawings, forming a part of this application, in which like reference characters indicate the corresponding parts throughout the several views, in which—

Figure 1 is a plan view of a turntable constructed in accordance with my invention, Fig. 2 is an enlarged fragmentary cross sectional view taken through the turntable and drive mechanism thereof, Fig. 3 is a view taken at right angles to Fig. 2, and partly in elevation so as to show the controlling means for the drive mechanism, Fig. 4 is a plan view of the turntable in its entirety, without showing the interior parts as is disclosed in Fig. 1, Fig. 5 is an enlarged vertical section showing the operating lever for the drive mechanism, Fig. 6 is an enlarged fragmentary plan view showing the manner of supporting the edge of the turntable and permitting it to turn freely, Fig. 7 is an enlarged sectional view showing one of the brake drums and its coöperating brake band, and Fig. 8 is a detailed perspective view showing a fragmentary part of the clutch mechanism.

Referring to the drawings in detail, in constructing my improved turntable, a circular well or depression 10 is provided in the ground or beneath a flooring, and on the inner surface of its surrounding wall is arranged a track 11 suitably supported on edge and of circular form. The turntable proper is designated by the numeral 12, being contiguous with the flooring around the well. Arranged on a central pivot axis 13 so as to turn thereon, is the turntable which comprises a supporting structure, including a cross rail 14 mounted as shown. The free ends of the cross rail 14 are offset to provide supporting portions 15 horizontally arranged above the bottom of the well and adapted to carry cross beams 16 mounted on the ends thereof at right angles, two of such beams being provided in spaced parallel relation and so spaced apart as to accommodate all makes of cars.

Secured to and projecting outwardly from the cross beams 16, are supporting arms 17, the same extending to the edge of the turntable and being disposed in pairs and projecting outwardly. The extremities of these cross beams 16 are connected by braces 18 as are the adjacent extremities of the cross beams 16 and the supporting arms 17, thus providing a rigid supporting structure entirely around the turntable, all of which may turn as an entirety, or the central portion 19 of which may remain stationary while the outer portion 12 in the form of an annulus turns with the automobile. In either event, a circular rack 20 is rigidly supported against turning as shown at 21, concentric to the axis 13 and the edges of the turntable and the well, said rack 20 having teeth 22 projecting outwardly from its upper edge, as shown.

In order to support the turntable while stationary or while being turned upon the circular track 11, there are arranged upon the extremities of the cross beams 16, rectangular frames 23, preferably of angle metal, of L-shaped formation, and provided with vertical sections 24 and horizontal sections 25 spaced in parallel relation and braced transversely as shown at 26, the outer extremities of the spaced upper horizontal sections 25 are made to conform to the periphery of circular edge of the turntable so as to be received within the well or depression above the track 11. These extremities serve to support diagonally arranged bearings 27 having spaced intermediate portions 28 designed to rotatably carry therebetween grooved rollers 29 adapted to rest upon the rail or track 11 and to rotate thereon during the turning of the turntable, when driven, as will hereinafter be more particularly set forth.

Also journaled in each of the frames 23, is a pair of spaced rollers 30 around which belts 31 are engaged, within the frames, said belts being four in number and being of some relatively strong material, which will support the weight of a car and serve to provide efficient traction between the wheels of the car and the belts engaged with the drive wheels, whether said wheels be the front wheels or the rear wheels.

The opposed inner pair of rollers at opposite sides of the turntable diametrically related, in the opposed series of belts are fixed upon the extremities of shafts 32 arranged beneath supporting plates 33 connecting the frames 23 and serving as bracing and spacing means therefor. These shafts 32 are journaled in bearings 34, and arranged intermediately on each is a worm 35 adapted to mesh with the worm gear or rack teeth 22 of the rack 20, the worm gears being of sharp pitch, as shown. Fixed to the worm 35 is a clutch member 36 and coacting therewith is a slidable clutch member 37 mounted on each shaft 32 or a sleeve 38 rotatably receiving said shaft and additionally supported by a hanger 39 of special construction. This hanger is provided with a rectangular opening 40 transversely of its upper portion, slidably receiving a non-rotatable square rod 41 the latter having at its inner end a forked or engaging member 42 depending therefrom to span the grooved movable clutch member 37 for the purpose of sliding the same into and out of engagement with the clutch member 36 upon the shafts 32. Means are provided to normally hold the clutches disengaged, and as shown, this means comprises an expansible spring 43 fitted between the hanger 39 and a stop 44 on the rod 41, normally shifting said rod to the right to disengage the clutch members, as is clearly shown in Fig. 2 of the drawings. The square rod 41 is made in two sections, the slidable section carrying a clutch member 45 at its outer extremity and coacting with a movable clutch member 46 arranged upon the rotatable section 47 supported in hangers 48 suspended from the supporting plates and brace members 33, the other end of the section 47 carrying an arm 49 connected, in each instance, through the medium of cables 50 with an operating lever 51. This lever is pivoted as shown at 52 within a hollow standard 53 arranged upon the turntable in the manner shown in Figs. 3 and 4 of the drawings, at one side of the alined belts at one side of the turntable, said lever 51 having a suitable grasping portion and outwardly extended arms 54 to which said cables 50 are connected, after being trained around pulleys 55 carried upon the turntable and pulleys 56 arranged within the standard at the upper and lower portions thereof.

In this manner, means is provided for exerting pull upon or slackening the oppositely extended cables 50 leading to the driving mechanism at diametrically opposite sides of the turntable and serving as a controlling means for the oppositely spaced pairs of traction elements for driving the turntable through the medium of the automobile wheels, as heretofore mentioned. Also fixed upon each shaft 32, is a brake drum 57 and engaged on each drum is a band 58, one end of the band being anchored to a plate 33, while the other end is provided with an apertured lug through which a threaded stem 59 is movably engaged at one end, the opposite end of said stem being connected to the free end of the lever or arm 49 to which one end of each cable 50 is connected. An intermediate spring 60 is provided between the apertured lug and the nut on the threaded end of the stem, so as to normally hold the band tight whereby to impede the rotation of the shaft 32. However, when a car is positioned upon the turntable and the drive wheels are engaged with the belts at one side and the automobile is started, owing to the rotation of the drive wheels of the automobile, the belt will be rotated and by this means rotation will be imparted to one of the shafts 32 by throwing the lever 51 on its pivot so as to release the corresponding spring 60 and throw out the brake formed by the drum and its band, thereby shifting the rod 41 longitudinally against the action of the spring 43 owing to the separation of the movable clutch member 45 with respect to the stationary clutch member 46 carried by the inner end of the rod section 47. In this way, the rod 41 will be shifted longitudinally thereby causing the clutch member 37 to engage the clutch member or section 36 and thereby impart rotation to the worm 35, for turning the table by its intermeshing engagement with the worm or rack 20. During the rotation of the table, the sharp pit of the worm gears will cause the worm gear which is idle to be rotated, the worm gear which is driven depending upon which pair of drive belts or tread members, the drive wheels are engaged with. In this manner, the automobile can be turned any desired direction, and by moving the lever 51 to a central position, the rotation of the worm gear and corresponding turning of the table will be stopped.

From the foregoing description taken in connection with the accompanying drawings, it is thought that a clear and comprehensive understanding of the construction, operation, and advantages of my invention may be had, and while I have shown and described the device as embodying a specific structure, I desire that it be understood that such changes may be made in said structure, as do not depart from the spirit and scope of the invention as claimed.

Having thus described my invention, what I claim as new and desire to secure by Letters Patent, is:

1. In a turntable of the class described, a well, a track supported in the well, a turntable having a supporting structure turnably supported at the axis of the well, rollers arranged on the table and engaging said track, at the outer edge thereof, means engageable with the drive wheels of a car for turning the table, pairs of spaced rollers journaled in the frame structure to project through openings in the table, belts engaged upon said pairs of rollers, and reversible drive mechanism associated with the rollers and the table for turning the table and stopping the same.

2. In a turntable of the class described, a well, a track supported in the well, a turntable having a supporting structure turnably supported at the axis of the well, rollers arranged on the table and engaging said track, at the outer edge thereof, means engageable with the drive wheels of a car for turning the table, pairs of spaced rollers journaled in the frame structure to project through openings in the table, belts engaged upon said pairs of rollers, shafts connected to opposed pairs of rollers to turn therewith, a circular rack beneath the table and suitably anchored against movement therewith, worm gears arranged upon said shafts, clutch means for keying the worm gears to the shafts whereby upon the belts being driven by the drive wheels of the car, rotation will be imparted to the worm gears in engagement with the rack to turn the table, and means for operating said clutching means.

3. In a turntable of the class described, a well, a track supported in the well, a turntable having a supporting structure turnably supported at the axis of the well, rollers arranged on the table and engaging said track, at the outer edge thereof, means engageable with the drive wheels of a car for turning the table, pairs of spaced rollers journaled in the frame structure to project through openings in the table, belts engaged upon said pairs of rollers, shafts connected to opposed pairs of rollers to turn therewith, a circular rack beneath the table and suitably anchored against movement therewith, worm gears arranged upon said shafts, clutch means for keying the worm gears to the shafts whereby upon the belts being driven by the drive wheels of the car, rotation will be imparted to the worm gears in engagement with the rack to turn the table, said shaft comprising two sections, clutch sections carried by said worm gears, movable clutch members carried by the other section of the shaft, means normally holding said clutch members disengaged, means for engaging said clutch members, and operating means arranged upon the turntable for operating said clutch members.

4. In a turntable of the class described, a well, a track supported in the well, a turntable having a supporting structure turnably supported at the axis of the well, rollers arranged on the table and engaging said track, at the outer edge thereof, means engageable with the drive wheels of a car for turning the table, pairs of spaced rollers journaled in the frame structure to project through openings in the table, belts engaged upon said pairs of rollers, shafts connected to opposed pairs of rollers to turn therewith, a circular rack beneath the table and suitably anchored against movement therewith, worm gears arranged upon said shafts, clutch means for keying the worm gears to the shafts whereby upon the belts being driven by the drive wheels of the car, rotation will be imparted to the worm gears in engagement with the rack to turn the table, said shaft comprising two sections, clutch sections carried by said worm gears, movable clutch members carried by the other section of the shaft, means normally holding said clutch members disengaged, means for engaging said clutch members, and brake means associated with the shaft and said operating means, said clutch means being associated with the brake means and operable against the action of the clutch disengaging means.

In testimony whereof, I affix my signature hereto.

JULIUS W. LOESSIN.